(12) United States Patent
Kuo et al.

(10) Patent No.: US 11,411,782 B1
(45) Date of Patent: Aug. 9, 2022

(54) ENHANCED DECISION FEEDBACK EQUALIZATION FOR MEMORY INTERFACES

(71) Applicant: DELL PRODUCTS, LP, Round Rock, TX (US)

(72) Inventors: Wan-Ju Kuo, Xindian District (TW); Douglas Winterberg, Austin, TX (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/218,660

(22) Filed: Mar. 31, 2021

(51) Int. Cl.
*H04L 25/03* (2006.01)
*G06F 13/16* (2006.01)

(52) U.S. Cl.
CPC .... *H04L 25/03057* (2013.01); *G06F 13/1668* (2013.01)

(58) Field of Classification Search
CPC ........................ H04L 25/03057; G06F 13/1668
See application file for complete search history.

(56) References Cited

U.S. PATENT DOCUMENTS

| | | | |
|---|---|---|---|
| 8,902,693 B2 | 12/2014 | Duffner | |
| 8,937,846 B2 | 1/2015 | Duffner et al. | |
| 9,143,369 B2 * | 9/2015 | He | H04L 25/03343 |
| 10,291,439 B1 * | 5/2019 | Taylor | G11C 7/1048 |
| 10,496,581 B2 * | 12/2019 | Lin | G06F 13/4022 |
| 2014/0092952 A1 * | 4/2014 | Aguilar-Arreola | H04L 25/14 375/233 |
| 2019/0222444 A1 * | 7/2019 | Sreeramaneni | H04L 25/03343 |
| 2020/0333396 A1 * | 10/2020 | Zhao | G01R 31/31709 |

FOREIGN PATENT DOCUMENTS

WO    WO-0209297 A3 *  6/2002 ......... H04L 25/0216

* cited by examiner

*Primary Examiner* — Freshteh N Aghdam
(74) *Attorney, Agent, or Firm* — Larson Newman, LLP

(57) ABSTRACT

An information handling system includes a memory controller and a dual in-line memory module (DIMM) coupled to the memory controller by a memory channel. The memory channel includes a plurality of single-ended multi-drop lanes arranged in a byte group. The information handling system determines, for each lane in the byte group, a tap setting for an associated decision feedback equalizer (DFE) of each lane. The information handling system further determines an average value for the tap settings for the lanes in the byte group, determines that a first tap setting for a first lane is different from the average value by greater than a threshold, and sets the first tap setting to the average value in response to determining that the first tap setting is different from the average value by greater than the threshold.

20 Claims, 3 Drawing Sheets

ENHANCED DECISION FEEDBACK EQUALIZATION FOR MEMORY INTERFACES

FIELD OF THE DISCLOSURE

This disclosure generally relates to information handling systems, and more particularly relates to enhanced decision feedback equalization for memory interfaces on an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory controller and a dual in-line memory module (DIMM) coupled to the memory controller by a memory channel. The memory channel may include a plurality of single-ended multi-drop lanes arranged in a byte group. The information handling system may determine, for each lane in the byte group, a tap setting for an associated decision feedback equalizer (DFE) of each lane. The information handling system may further determine an average value for the tap settings for the lanes in the byte group, determine that a first tap setting for a first lane is different from the average value by greater than a threshold, and set the first tap setting to the average value in response to determining that the first tap setting is different from the average value by greater than the threshold.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
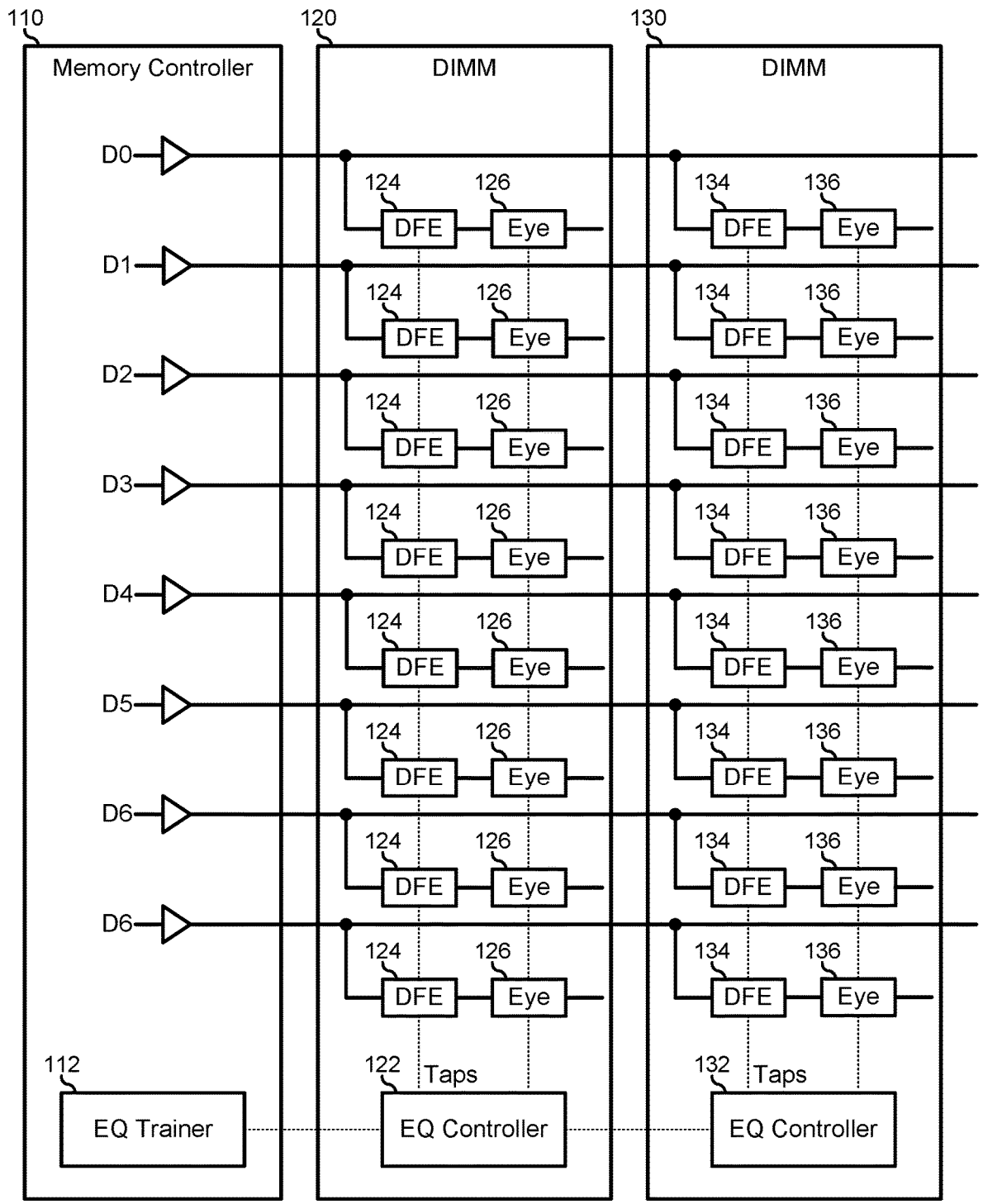
FIG. 1 is a block diagram illustrating an information handling system according to an embodiment of the current disclosure.

FIG. 1 illustrates an information handling system 100 including a memory controller 110, and Dual In-Lane Memory Modules (DIMMs) 120 and 130. Memory controller 110 represents an element of information handling system 100 that operates to control the data traffic to the main memory of the information handling system, including DIMMs 120 and 130. Memory controller 110 may be provided as a discrete device within information handling system 100, or may be integrated with other elements of the information handling system, such as a processor or chipset component of the information handling system. Memory management unit 110 and DIMMs 120 and 130 are each configured in accordance with a particular memory architecture standard, such as a fourth generation Double Data Rate standard (DDR4), a fifth generation DDR standard (DDR5), or the like. As such, memory controller 110 and DIMMs 120 and 130 are connected via one or more memory busses, including a data bus, a command/address bus, and other control signals in accordance with the particular memory architecture standard. In the case where memory controller 110 and DIMMs 120 and 130 are provided in accordance with a DDR4 standard, the memory controller and the DIMMs will be understood to be connected via up to 72 bi-directional data bus lanes (64 data bits and eight error checking and correcting (ECC) bits), and 24 command/address bus lanes. In the case where memory controller 110 and DIMMs 120 and 130 are provided in accordance with a DDR5 standard, the memory controller and the DIMMs will be understood to be connected via two separate channels, each channel including up to 40 bi-directional data bus lanes (32 data bits and eight ECC bits), and 7 command/address bus lanes.

Memory controller 110 and DIMMs 120 and 130 are illustrated with an exemplary eight data bus lanes (D0-D7) with transmitter circuitry 112 in the memory controller. Each of DIMMs 120 and 130 tap off of the data bus lane to send and receive data. Memory controller 110 will be understood to include receiver circuitry on each data bus lane, and DIMMs 120 and 130 will be understood to include transmitter circuitry on each data bus lane, and each data bus lane will thus be understood to represent a bi-directional single-ended multi-drop data lane. FIG. 1 is therefore a highly simplified representation of the typical interfaces between memory controllers and DIMMs, and will be understood to include any and all additional interconnections as specified by the relevant memory architecture specification, and all teachings provided herein that are described in the context of lane training and lane DFEs within the DIMMs will apply to lane training and lane DFEs within a memory controller. The details of memory interfaces are known in the art and will not be further described herein except as needed to illustrate the current embodiments.

It will be understood that the speed of data transfers on the interfaces of current memory architectures is increasing to be on par with typical serial link data transfer speeds. For example, current memory architecture standards are providing for data transfer speeds of 4.0-8.0 gigabits per second (Gbps). At such speeds, data recovery at the receiver end becomes a challenge due to inter-symbol interference (ISI), reflections due to discontinuities in the signal path, crosstalk from other nearby data lanes, and the like. ISI is a distortion effect that results from the rapid state changes between sequentially transmitted symbols, and their resonant effects on subsequently transmitted signals. A particular countermeasure to deal with ISI effects in the data lanes is to provide decision feedback equalization at the receiver end of a data communication lane. As such, FIG. 1 illustrates DIMM 120 as including an equalization controller 122, and a DFE 124 in each data lane receive path for conditioning of the received signal prior to detecting the transmitted data by an eye detector 126. Similarly, DIMM 130 includes an equalization controller 132, and a DFE 134 in each data lane receive path for conditioning of the received signal prior to detecting the transmitted data by an eye detector 136. Each of DFEs 124 and 134 are controlled by a "taps" input. Here, a tap represents a non-negative integer number of previously detected symbols to feed back into the evaluation of the current symbol. It will be understood that a DFE may typically represent a finite impulse response (FIR) filter, or other signal processing element as needed or desired. The details of DFE equalization and the selection of a number of taps to provide for a particular data lane is known in the art and will not be further described herein except as needed to illustrate the current embodiments.

When a memory channel is initialized, a training process is implemented that determines for each receiver on each lane is trained to determine an optimal setting for the number of taps to apply to its associated DFE. It has been understood by the inventors of the current disclosure that, in training the multiple DFEs, large variations in the trained value may occur between training runs. However, such variations in the trained DFE values are not to be expected because the signal paths for each data lane within a particular byte group are typically specified to be as close to identical as possible. For example data lanes within a particular byte group may be specified to be within 120 mils length of each other, data strobe lanes within a particular byte group may be specified to be within 220 mils, and command/address lanes within a particular byte group may be specified to be within 300 mils of each other. As such, the DFE tap setting for the DFEs within a particular byte group should normally be expected to be similar to each other. However, a typical procedure for handling widely differing DFE taps values within a particular byte group includes rerunning the training for that byte group to obtain converged settings for each DFE within a byte group for each device. This typical procedure necessitates a prolonged training procedure that may be unacceptably long from the perspective of a user of the information handling system. In particular, the number of DIMMs is expected to increase from a current number of 8-12 DIMMs per CPU to upwards of 24 DIMMs per CPU, increasing the likelihood of user dissatisfaction.

During training, an equalization trainer 112 directs equalization controllers 122 and 132 to set the taps settings for respective DFEs 124 and 134 as the transmitters transmit various training sequences. Eye detectors 126 and 136 detect the transmitted sequences and determine when an optimal receiver eye is created. Equalization controllers 122 and 132 operate to correlate the taps values for each of respective DFEs 124 and 134 with the best receiver eye as determined by respective eye detectors 126 and 136. When training is completed, equalization controllers 122 and 132 operate to set the taps settings for each of respective DFEs 124 and 134 to the values associated with their best receiver eyes. In a particular embodiment, when the DFE tap settings in a particular DIMM for a particular byte group have mostly consistent values after training, and only a few DFE tap setting differ from the rest of the settings then the associated equalization controller operates to set the tap settings for the few DFEs to be more in harmony with the other tap settings. In a particular case, when the anomalous tap settings differ from an average of the other tap settings by greater than a predetermined threshold, such as by two (2) or more tap settings, then the associated equalization controller sets the tap settings for the anomalous DFEs to the average setting for the byte group. Table 1, below illustrates a case where an information handling system includes three DIMMs and shows exemplary trained tap setting values where one DFE tap setting value is anomalous. Table 1 further illustrates the corrective action taken by the affected DIMMs. Here, it can be seen that the DFE tap settings for lane D2 are anomalous from the other lanes in the byte group. In this case, the equalization controllers in each of the DIMMs operates to overwrite the average value for the DFEs in the byte group into the tap setting for the anomalous lane.

TABLE 1

Trained and Modified Tap values for one anomalous lane

| Lane | DFE0 | DFE1 | DFE2 | Action | Lane | DFE1 | DFE2 | DFE2 |
|---|---|---|---|---|---|---|---|---|
| D0 | 16 | 4 | 2 | | D0 | 16 | 2 | 2 |
| D1 | 17 | 3 | 1 | | D1 | 17 | 3 | 1 |
| D2 | 12 | 8 | 4 | Overwrite | D2 | 16 | 8 | 4 |
| D3 | 16 | 4 | 1 | | D3 | 16 | 4 | 1 |
| D4 | 15 | 4 | 1 | | D4 | 15 | 4 | 1 |
| D5 | 17 | 3 | 1 | | D5 | 17 | 3 | 1 |
| D6 | 17 | 4 | 1 | | D6 | 17 | 4 | 1 |
| D7 | 17 | 3 | 2 | | D7 | 17 | 3 | 2 |
| Average | 16 | 4 | 2 | | Average | 16 | 4 | 2 |

Table 2, below illustrates a case where an information handling system includes three DIMMs and shows exemplary trained tap setting values where several DFE tap setting values are anomalous. Table 2 further illustrates the corrective action taken by the affected DIMMs. Here, it can be seen that the DFE tap settings for lane D2 are anomalous from the other lanes in the byte group. In this case, the equalization controllers in each of the DIMMs operates to retrain the particular byte group to obtain converged tap setting values across the byte group.

TABLE 2

Trained and Modified Tap values for one anomalous lane

| Lane | DFE0 | DFE1 | DFE2 | Action | Lane | DFE1 | DFE2 | DFE2 |
|---|---|---|---|---|---|---|---|---|
| D0 | 16 | 4 | 2 | Retrain | D0 | 16 | 2 | 2 |
| D1 | 17 | 3 | 1 | | D1 | 17 | 3 | 1 |
| D2 | 12 | 8 | 4 | | D2 | 16 | 8 | 4 |
| D3 | 16 | 4 | 1 | | D3 | 16 | 4 | 1 |
| D4 | 11 | 7 | 5 | | D4 | 15 | 4 | 1 |
| D5 | 17 | 3 | 1 | | D5 | 17 | 3 | 1 |
| D6 | 10 | 9 | 5 | | D6 | 17 | 4 | 1 |
| D7 | 11 | 8 | 5 | | D7 | 17 | 3 | 2 |
| Average | 14 | 4 | 2 | | Average | 16 | 4 | 2 |

Figure 2:
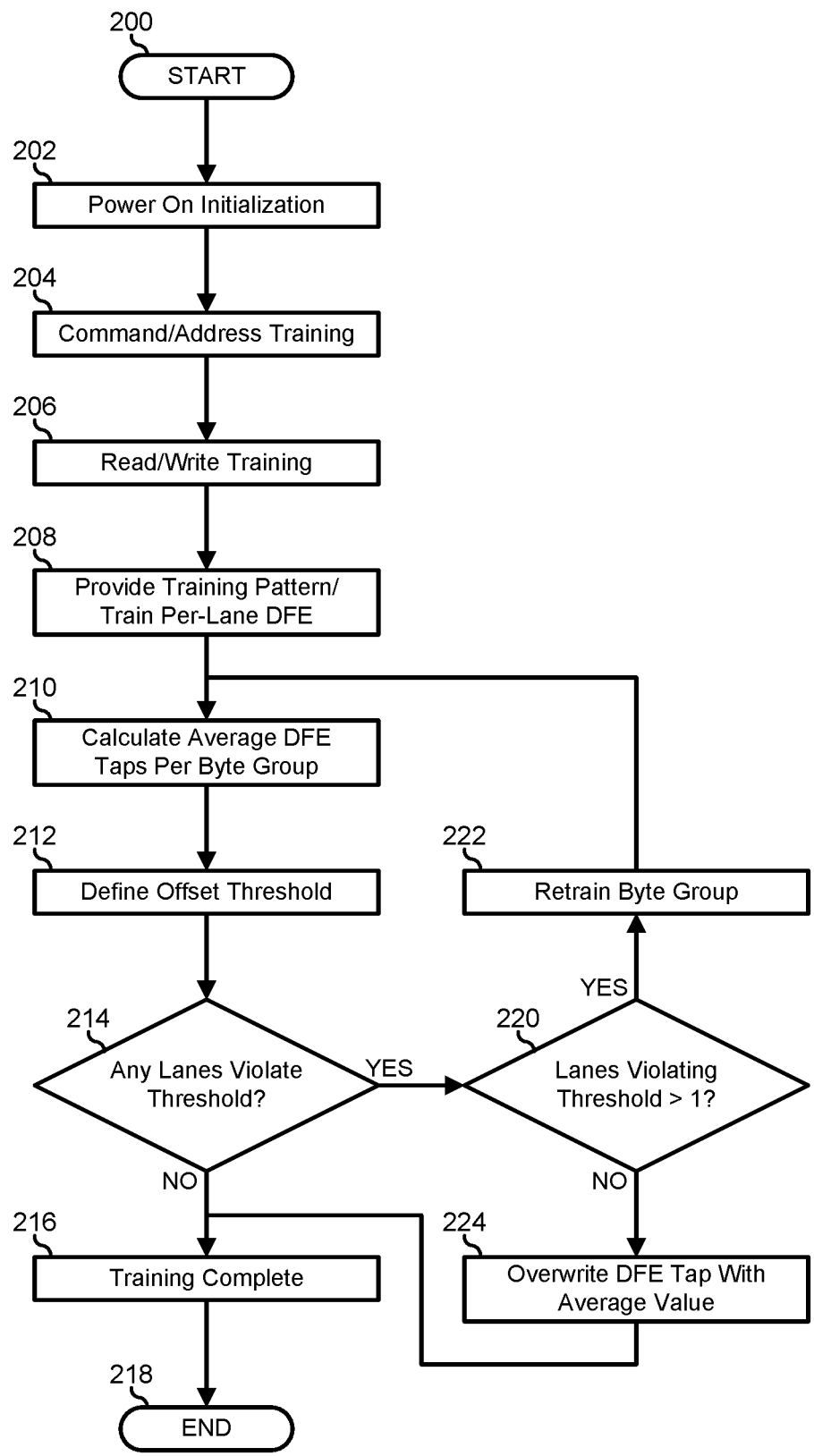
FIG. 2 is a flowchart illustrating a method for enhanced decision feedback equalization (DFE) for memory interfaces on an information handling system according to an embodiment of the current disclosure.

FIG. 2 illustrates a method for enhanced DFE for memory interfaces on an information handling system starting at block 200. Power on initialization of a memory channel is started in block 202. The command/address training is performed in block 204, and read/write training is performed in block 206. A training pattern is transmitted and the DFE taps are determined for each lane in block 208. An average of the tap values for each byte group is determined in block 210. A threshold for offsets from the average is defined in block 212. Here, in a first embodiment, the threshold for the offsets from the average may be defined as a preset value, such as a two-step offset threshold, a three-step offset threshold, or the like. In another embodiment, the threshold for the offsets from the average may be determined in response to determining the average of the tap values for each byte group. For example, the threshold for the offsets may be defined as a percentage variance from the average value. Thus, where the average of the tap values is 10, and the threshold is 20 percent, then the offset value would be set to a two-step offset threshold, and where the average of the tap values is 20, the 20 percent threshold would result in a four-step offset threshold. A decision is made as to whether or not any lanes within the byte groups violate the offset threshold in decision block 214. If not, the "NO" branch of decision block 214 is taken, the training is completed, and the method ends in block 218. If any tap values for any lanes within any byte groups violate the offset threshold, then, for those byte groups, the "YES" branch of decision block 214 is taken and a decision is made as to whether or not more than one lane violates the offset threshold in decision block 220. If not, the "NO" branch of decision block 220 is taken, and block 224 is executed where the DFE taps value for the single anomalous lane is overwritten with the average value as found in block 210, the training is completed in block 216, and the method ends in block 218. If more than one tap value within a byte group violates the offset threshold, the "YES" branch of decision block 220 is taken, the entire byte group is retrained in block 220, and the method returns to block 210 where the average of the tap values for the retrained byte group is determined.

Figure 3:
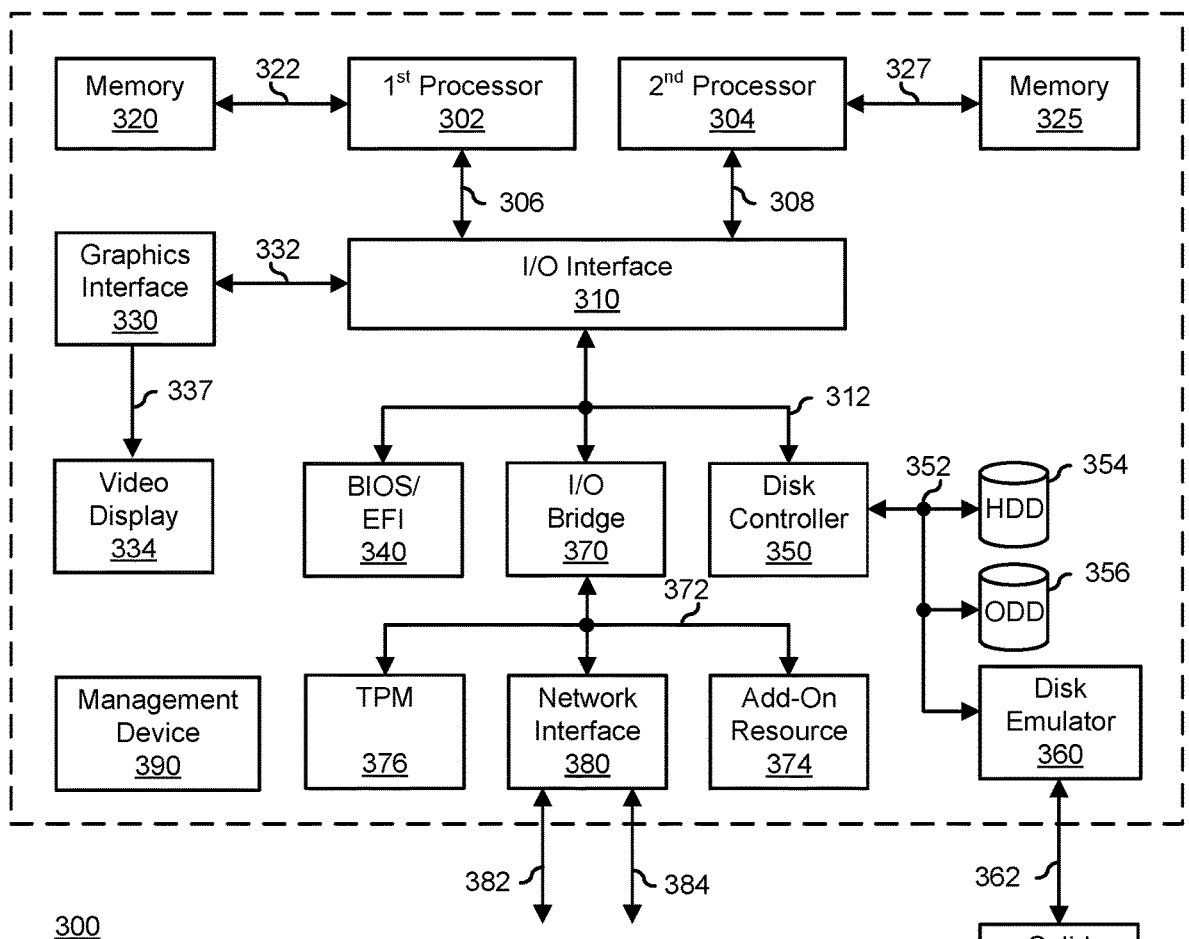
FIG. 3 is a block diagram illustrating a generalized information handling system according to another embodiment of the current disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a memory controller; and
   a dual in-line memory module (DIMM) coupled to the memory controller by a memory channel, the memory channel including a plurality of single-ended multi-drop lanes, the lanes being arranged in a byte group;
   wherein the information handling system is configured to:
      for each lane in the byte group, determine a tap setting for an associated decision feedback equalizer (DFE) of each lane;

determine an average value for the tap settings for the lanes in the byte group;

determine that a first tap setting for a first lane is different from the average value by greater than a threshold; and set the first tap setting to the average value in response to determining that the first tap setting is different from the average value by greater than the threshold.

2. The information handling system of claim 1, wherein the information handling system is further configured to:

determine that a second tap setting for a second lane and a third tap setting for a third lane are both different from the average value by greater than the threshold; and for each lane in the byte group, redetermine the tap settings for the associated DFE of each lane in response to determining that the second tap setting and the third tap setting are both different from the average value by greater than the threshold.

3. The information handling system of claim 1, wherein the DFEs are associated with receivers in the DIMM.

4. The information handling system of claim 1, wherein the DFEs are associated with receivers in the memory controller.

5. The information handling system of claim 1, wherein the threshold is a predetermined number of tap setting steps.

6. The information handling system of claim 1, wherein the threshold is determined in response to determining the average value for the tap settings.

7. The information handling system of claim 6, wherein the threshold is determined as a percentage of the average value for the tap settings.

8. The information handling system of claim 1, wherein the memory channel is a double data rate (DDR) memory channel.

9. The information handling system of claim 8, wherein the DDR memory channel is a fifth generation (DDR5) memory channel.

10. A method, comprising:

coupling a memory controller of an information handling system to a dual in-line memory module (DIMM) of the information handling system by a memory channel, the memory channel including a plurality of single-ended multi-drop lanes, the lanes being arranged in a byte group;

determining, for each lane in the byte group, a tap setting for an associated decision feedback equalizer (DFE) of each lane;

determining an average value for the tap settings for the lanes in the byte group;

determining that a first tap setting for a first lane is different from the average value by greater than a threshold; and setting the first tap setting to the average value in response to determining that the first tap setting is different from the average value by greater than the threshold.

11. The method of claim 10, further comprising:

determining that a second tap setting for a second lane and a third tap setting for a third lane are both different from the average value by greater than the threshold; and redetermining, for each lane in the byte group, the tap settings for the associated DFE of each lane in response to determining that the second tap setting and the third tap setting are both different from the average value by greater than the threshold.

12. The method of claim 10, wherein the DFEs are associated with receivers in the DIMM.

13. The method of claim 10, wherein the DFEs are associated with receivers in the memory controller.

14. The method of claim 10, wherein the threshold is a predetermined number of tap setting steps.

15. The method of claim 10, wherein the threshold is determined in response to determining the average value for the tap settings.

16. The method of claim 15, wherein the threshold is determined as a percentage of the average value for the tap settings.

17. The method of claim 10, wherein the memory channel is a double data rate (DDR) memory channel.

18. The method of claim 8, wherein the DDR memory channel is a fifth generation (DDR5) memory channel.

19. An information handling system, comprising:

a memory controller; and a dual in-line memory module (DIMM) coupled to the memory controller by a memory channel, the memory channel including a plurality of single-ended multi-drop lanes, the lanes being arranged in a byte group;

wherein the information handling system is configured to:

for each lane in the byte group, determine a tap setting for an associated decision feedback equalizer (DFE) of each lane;

determine an average value for the tap settings for the lanes in the byte group;

determine that a first tap setting tap setting for a first lane and a second tap setting for a second lane are both different from the average value by greater than the threshold; and for each lane in the byte group, redetermine the tap settings for the associated DFE of each lane in response to determining that the first tap setting and the second tap setting are both different from the average value by greater than the threshold.

20. The information handling system of claim 19, wherein the threshold is determined in response to determining the average value for the tap settings.

* * * * *